Dec. 4, 1928.

L. R. DAVIDSON ET AL 1,693,691

BALL COCK

Filed July 29, 1927

L. R. Davidson
H. F. Rahl  Inventor

By C. A. Snow & Co.
Attorneys

Patented Dec. 4, 1928.

1,693,691

UNITED STATES PATENT OFFICE.

LEO R. DAVIDSON AND HENRY F. RAHL, OF STURGIS, MICHIGAN.

BALL COCK.

Application filed July 29, 1927. Serial No. 209,305.

This invention relates to float actuated valves especially designed for use in flush tanks and aims to provide novel means whereby the valve may be adjusted to compensate for wear, thereby insuring a leak-proof valve at all times.

A further object of the invention is to provide a valve of this type which may be readily and easily removed should it be desired to replace the washer or repair the valve.

A still further object of the invention is to provide a valve of this character which may be manually operated and set to cut off the supply of water through the feed pipe, so that repairs on the flush tank and cooperating elements thereof may be readily and easily made.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing.

Figure 1:
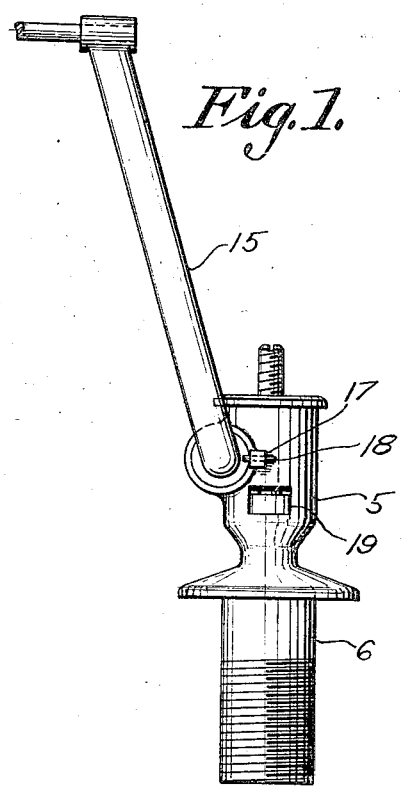
Figure 1 is a side elevational view of a valve constructed in accordance with the invention.
Figure 2:
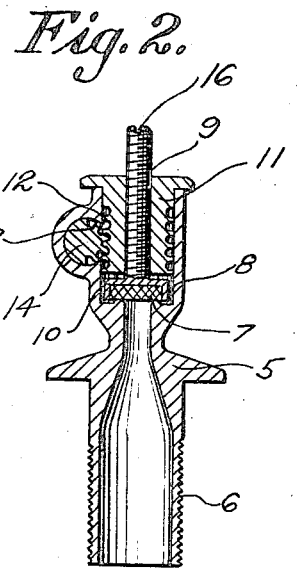
Figure 2 is a vertical sectional view therethrough.
Figure 4:
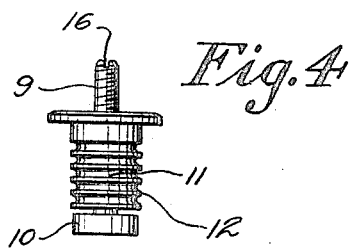
Figure 4 is an elevational view of the valve.
Figure 3:
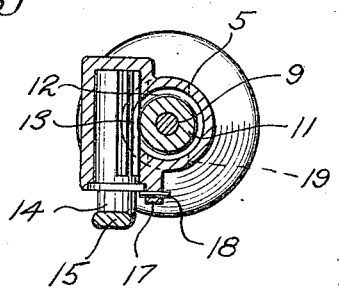
Figure 3 is a sectional view taken transversely through the upper portion of the valve.

Referring to the drawing in detail, the valve includes a body portion 5 having a threaded pipe section 6 designed to be positioned in the feed pipe feeding water to a flush tank.

The valve body is provided with a seat 7 and an enlarged portion in which the valve proper indicated at 8, moves.

The valve embodies a threaded shank 9 and a head 10 in which the valve washer is positioned, which valve washer moves into engagement with the seat to cut off the passage of water through the valve body.

As shown, the threaded shank 9 is supported in a threaded opening formed in the movable valve support 11 which is provided with circular grooves defining ribs 12 that are adapted to be engaged by the ribs or teeth 13, of the right angled portion 14 of the float arm 15, to the end that as the arm 15 is moved vertically, the support 11 together with the valve, will be moved vertically to accomplish the purpose of the invention.

At the upper end of the threaded shank 9 is a slot 16 for the reception of a screw driver so that the shank 9 may be rotated to adjust the valve towards and away from the valve seat 7 thereby compensating for wear and insuring a fluid-tight valve at all times.

Should it be desired to cut off the flow of water through the pipe, the arm 15 may be moved to the limit of its downward movement and held in such position, whereupon the shank 9 may be rotated to cause the valve to seat at 7 and prevent the flow of water into the flush tank to permit repairs to be made to the flush tank with facility.

Extending laterally from the valve body is a lug 17 formed with an opening to receive the pin 18 that bears against one end of the right angled portion 14 of the arm 15, to hold the same in position.

Thus it will be seen that by removing the pin, the float actuated arm may be readily removed and replaced.

Openings 19 are formed in the sides of the valve body and establish communication between the valve body and exterior thereof, so that water may pass upwardly through the valve body and laterally through these openings exhausting into the flush tank in which the valve is positioned.

From the foregoing it will be seen that due to the construction shown and described, the valve may be raised and lowered as the float actuated arm 15 is raised and lowered, thereby providing a valve which is exceptionally easily operated and one which may be adjusted to meet various requirements.

We claim:

1. A valve of the class described including a movable member, having a threaded bore, a threaded shank disposed within the bore and having a head carrying a washer, a body portion and a valve seat within the body portion against which the washer moves, said shank having a slot at its upper end to receive a screw driver for adjusting the threaded shank with respect to the movable member to adjust the valve and means for actuating said movable member.

2. A valve of the class described including a body portion having a valve seat, a vertically movable member in the body portion, a vertically adjustable member extending through the vertically movable member and having a head at its lower end, a washer on the head and adapted to engage the valve seat to control the passage of fluid through the body portion the upper end of the vertically adjustable member terminating above the upper surface of the vertically movable member to be engaged by a tool, and means for moving the vertically movable member within the body portion.

In testimony that we claim the foregoing as our own, we have hereto affixed our signatures.

LEO R. DAVIDSON.
HENRY F. RAHL.